June 17, 1952　　　　　J. W. PICKING　　　　　2,601,002
ELECTRICAL CONTROL SYSTEM
Filed July 24, 1946　　　　　　　　　　　　　2 SHEETS—SHEET 1

Fig. 1

INVENTOR.
BY　Jay W. Picking
Hoodling and Krost
　　　　　attys.

June 17, 1952 — J. W. PICKING — 2,601,002
ELECTRICAL CONTROL SYSTEM
Filed July 24, 1946 — 2 SHEETS—SHEET 2

INVENTOR.
Jay W. Picking
BY Woodling and Krost,
Attys.

Patented June 17, 1952

2,601,002

UNITED STATES PATENT OFFICE 2,601,002

ELECTRICAL CONTROL SYSTEM

Jay W. Picking, Cleveland, Ohio, assignor to The Reliance Electric & Engineering Company, a corporation of Ohio Application July 24, 1946, Serial No. 685,948

20 Claims. (Cl. 318—154)

My invention relates in general to electrical control systems and more particularly to electrical control systems adapted to control the speed of an electric motor or the voltage output of a generator.

An object of my invention is the provision of an electrical control circuit for substantially linearly varying the speed of an electric motor or for linearly varying the operation of a dynamoelectric machine.

Another object of my invention is to give substantially linearly variable speed control to a direct current motor to any predetermined speed from a relatively low value to a relatively high value compared to the rated speed of the motor.

Another object of my invention is the provision of an electrical control system to give substantially linearly variable speed control at a predeterminable variable rate to an electric motor to any predeterminable speed.

Another object of my invention is the provision of an electrical control system for substantially constant acceleration or deceleration of a direct current motor at a predeterminably variable rate to any predeterminable speed, the direct current electrical energy for the motor coming from a direct current generator, the fields of the direct current motor and generator being separately excited and controlled by the said electrical control system.

Another object of my invention is an electrical control circuit to linearly vary the speed of a direct current electric motor which derives its power from a motor generator set, wherein the speed control is obtained by linearly varying the output voltage of the direct current generator for below rated speeds of the electric motor, and an automatic change-over is accomplished in the control circuit to control the excitation of the motor field for speeds above the rated speed of the said electric motor.

Other objects and a fuller understanding of my invention may be had by referring to the following description and claims, taken in conjunction with the accompanying drawing, in which:

Figure 1:
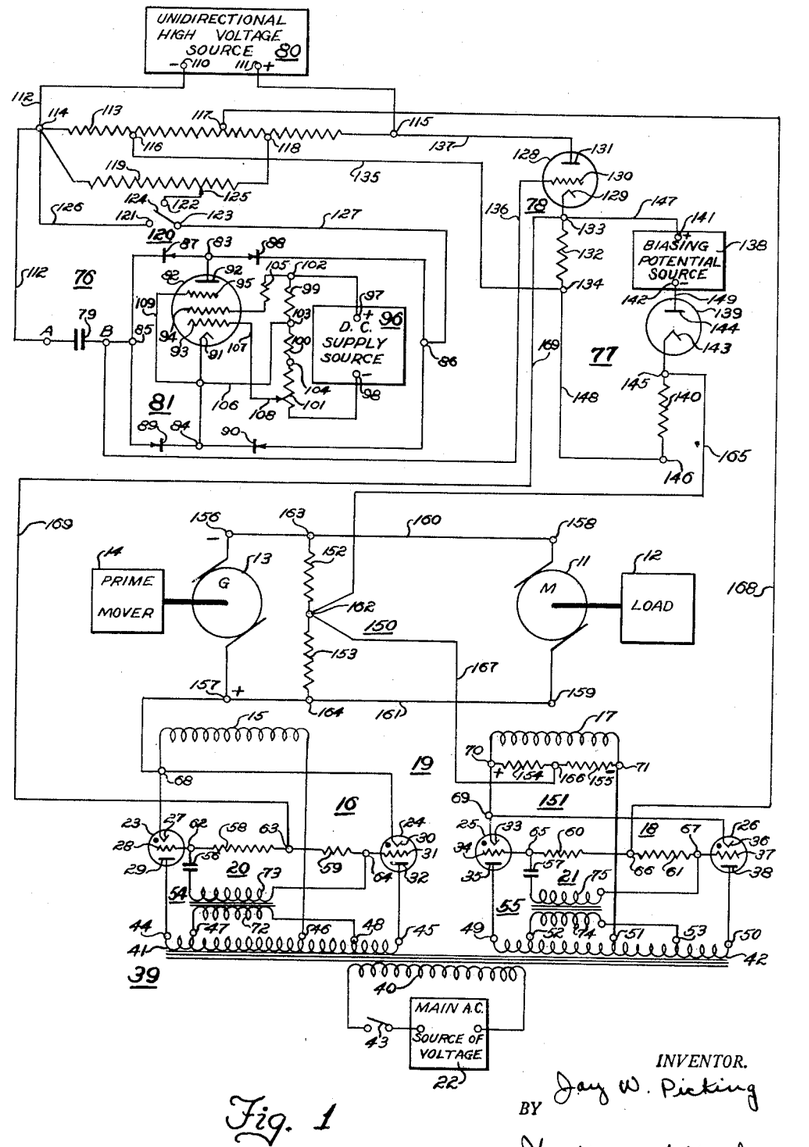
Figure 1 diagrammatically represents an electrical control system embodying my invention.

With reference to Figure 1 a motor 11 drives a load 12, the motor 11 deriving its power from a generator 13. The generator 13 is driven from a prime mover 14. The generator 13 has a field 15, the field 15 deriving its power from a first excitation means 16. The motor 11 has a field 17, the field 17 deriving its power from a second excitation means 18. A main alternating current source of voltage 22 supplies energy for both the first and second excitation means 16 and 18. The first excitation means 16 for exciting the generator field 15 includes a first and second gaseous discharge device with reference characters 23 and 24 respectively, and the second excitation means 18 for the motor field 17 includes a third and fourth gaseous discharge device with reference characters 25 and 26 respectively. With two gaseous discharge devices for each excitation means, full wave rectification is thereby obtained. The first gaseous discharge device 23 has a cathode 27, a control grid 28 and an anode 29. The second gaseous discharge device 24 has a cathode 30, a control grid 31 and an anode 32. The third gaseous discharge device 25 has a cathode 33, a control grid 34 and an anode 35. The fourth gaseous discharge device 26 has a cathode 36, a control grid 37 and an anode 38. A main transformer 39 for supplying electrical energy to the first and second excitation means has a primary winding 40, a first secondary winding 41 and a second secondary winding 42. The primary winding 40 of the main transformer 39 is connected through a switch 43 to the main A. C. source of voltage 22. The first secondary winding 41 of the main transformer 39 has end terminals 44 and 45, a midtap 46, and two supplementary taps 47 and 48, one on either side of the midtap 46. The second secondary winding 42 of the main transformer 39 has end terminals 49 and 50, a midtap 51, and supplementary taps 52 and 53, one on either side of the midtap 51. To complete the full wave rectifier circuit of the first excitation means, the cathodes 27 and 30 of the first and second gaseous discharge devices are connected together to one end of the generator field 15 at the connection 68. The other end of the generator field 15 being connected to the midtap 46 of the first secondary winding 41 of the main transformer 39, and the anodes 29 and 32 of the first and second gaseous discharge devices are connected to the end terminals 44 and 45 of the first secondary winding 41 of the main transformer 39. To complete the full wave rectifier circuit of the second excitation means, the cathodes 33 and 36 of the third and fourth gaseous discharge devices 25 and 26 are connected together to one end of the motor field 17, at the connection 69, the other end of the motor field 17 being connected to the midtap 51 of the second secondary winding 42 of the main transformer 39, and the anodes 35 and 38 of the third and fourth gaseous discharge devices 25 and 26 are connected to the end terminals 49 and 50 of the second secondary winding 42 of the main transformer 39. In the first excitation means 16, a first transformer 54 has a primary winding 72 and a secondary winding 73. The secondary winding 72 is connected to the supplementary taps 47 and 48 of the first secondary winding 41 of the main transformer 39. In the second excitation means 18, a second transformer 55 has a primary winding 74 and a secondary winding 75. The primary winding 74 is connected to the supplementary taps 52 and 53 of the second secondary winding 42 of the main transformer 39. A control means 19 includes a first and second grid circuit means 20 and 21 whereby the first grid circuit means 20 impresses a first A. C. potential between the cathodes and control grids of the first and second gaseous devices, and the second grid circuit means 21 impresses a second A. C. potential between the cathodes and control grids of the third and fourth gaseous discharge devices. The first grid circuit means 20 comprises the secondary winding 73 of the first transformer 54, first and second control grid resistors 58 and 59, and a condenser 56. The first and second control grid resistors 58 and 59 are connected in series between the control grids 28 and 31 of the first and second gaseous discharge devices 23 and 24. The control grid 28 connects to the first control grid resistor 58 at the connection 62, the first and second control grid resistors connect together at the connection 63, and the second control grid resistor 59 is connected to the control grid 31 at the connection 64. The condenser 56 is connected between the connection 62 and one end of the secondary winding 73 of the first transformer 54, and the other end of the secondary winding 73 is connected to the connection 64. The second grid circuit means 21 comprises the secondary winding 75 of the second transformer 55, a third and fourth control grid resistor 60 and 61, and a condenser 57. The third and fourth control grid resistors 60 and 61 are connected in series between the control grids 34 and 37 of the third and fourth gaseous discharge devices 25 and 26. The control grid 34 connects to the third control grid resistor 60 at the connection 65, the third and fourth control grid resistors 60 and 61 connect together at connection 66 and the fourth control grid resistor 61 connects to the control grid 37 at the connection 67. The condenser 57 is connected between the connection 65 and one end of the secondary winding 75 of the second transformer 55, and the other end of the secondary winding 75 is connected to the connection 67. Upon energization of the first and second transformers 54 and 55, a first alternating current potential is developed in the first grid circuit means 20 across the first control grid resistor 58 and across the second control grid resistor 59, and a second alternating current potential is developed in the second grid circuit means 21 across the third control grid resistor 60 and across the fourth control grid resistor 61. The first alternating current potential is impressed between the cathodes and control grids of the first and second gaseous discharge devices 23 and 24, and the second A. C. potential is impressed between the cathodes and the control grids of the third and fourth gaseous discharge devices 25 and 26. By so impressing an A. C. potential between the said cathodes and said control grids, a basis is established for controlling the rectified output of the gaseous discharge devices, thereby controlling the amount of excitation of the first and second excitation means, and thereby varying the speed of the motor 11.

A potential source 76 is used to modify the control means 19. A voltage dividing circuit 77 is connected between the potential source 76 and the control means 19. An impedance matching circuit 78 is used to couple the potential source 76 to the voltage dividing circuit 77. The potential source 76 is a circuit that generates an essentially linearly variable voltage across a condenser 79. The voltage across the condenser 79 is applied through the impedance matching circuit 78 to the voltage dividing circuit 77, which divides this voltage into a first and second output voltage for modifying the first and second A. C. potentials impressed between the cathodes and control grids of the gaseous discharge devices of the first and second excitation means respectively.

The potential source 76 is substantially the same as my "Linear Voltage Generator," Serial No. 685,947, now Patent No. 2,505,688, dated April 25, 1950, filed on even date herewith.

The potential source 76 comprises a bridge rectifier 81, a thermionic pentode tube 82 across the output terminals of the bridge rectifier 81, the condenser 79 and a unidirectional high voltage source 80, the condenser 79 and the unidirectional high voltage source 80 being disposed in series circuit relationship across the input terminals of the bridge rectifier 81. The bridge rectifier 81 has a first input terminal 85 and a second input terminal 86, a first output terminal 83 and a second output terminal 84. The bridge rectifier 81 has first, second, third, and fourth unidirectional current passing devices with reference numbers 87, 88, 89 and 90 respectively. In the description, current will be assumed to flow in the same direction as the electrons, and current and electron current will be synonymous. The first unidirectional current passing device 87 is connected to pass electron current from the first output terminal 83 to the first input terminal 85. The second unidirectional current passing device 88 is connected to pass electron current from the first output terminal 83 to the second input terminal 86. The third unidirectional current passing device 89 is connected to pass electron current from the first input terminal 85 to the second output terminal 84; and the fourth unidirectional current passing device 90 is connected to pass electron current from the second input terminal 86 to the second output terminal 84. The thermionic pentode tube 82 has a cathode 91, an anode 92, a control grid 93, a screen grid 94, and a suppressor grid 95. The anode 92 of the thermionic pentode tube 82 is connected to the first output terminal 83, and the cathode 91 is connected to the second output terminal 84 of the bridge rectifier 81. A D. C. supply source 96 supplies D. C. potential to the screen grid 94 and the control grid 93 of the thermionic pentode tube 82. The D. C. supply source 96 has a positive terminal 97 and a negative terminal 98. Connected across these terminals of the D. C. supply source 96 is a screen grid potential resistor 99, a control grid potential limiting resistor 100 and a control grid potentiometer 101 in series. A connection 102 connects the positive end of the screen grid potential resistor 99 to the positive terminal 97 of the D. C. supply source 96. A connection 103 connects the negative end of the screen grid potential resistor 99 to the positive end of the control grid potential limiting resistor 100. A connection 104 connects the positive end of the control grid potentiometer 101 to the negative end of the control grid potential limiting resistor 100. The negative end of the control grid potentiometer 101 is connected to the negative terminal 98 of the D. C. supply source 96. The screen grid potential which appears at the positive terminal 97 of the D. C. supply source 96 and at the connection 102, is applied to the screen 94 of the thermionic pentode tube 82 through the current limiting resistor 105. The cathode 91 of the thermionic pentode tube 82 is connected through the conductor 106 to the connection 103 between the resistor 99 and 100, to provide the reference voltage for the cathode 91. The control grid 93 is connected through the conductor 107 to the movable finger 108 on the potentiometer 101, to provide a variable negative voltage on the control grid 93 with respect to the cathode 91 of the thermionic pentode tube 82. The control grid potential limiting resistor 100 prevents the negative potential of the control grid 93 with respect to the cathode 91 from becoming too small a value. The suppressor grid 95 is connected through a conductor 109 to the cathode 91. The condenser 79 has a first terminal A and a second terminal B. The second terminal B is connected to the first input terminal 85 of the bridge rectifier 81. The unidirectional high voltage source 80 has a negative terminal 110 and a positive terminal 111. The first terminal A of the condenser 79 is connected to the negative terminal 110 of the unidirectional high voltage source 80 through a conductor 112. A voltage dividing resistor 113 is connected across the terminals 110 and 111 of the unidirectional high voltage source 80. The voltage dividing resistor 113 has two end terminals 114 and 115, and three intermediate terminals 116, 117 and 118. The end terminal 114 of the voltage dividing resistor 113 is connected to the negative terminal 110 of the unidirectional high voltage source 80, and the other end terminal 115 is connected to the positive terminal 111. A potentiometer 119 is connected between the terminals 114 and 118 of the voltage dividing resistor 113. A single pole double throw switch 120 is connected to either include or exclude the unidirectional high voltage source 80 from the series circuit arrangement, and has a first connection 121, a second connection 122, a common connection 123 and a contact member 124. A movable finger 125 of the potentiometer 119 is connected to the second connection 122 of the switch 120. A conductor 126 connects the first terminal 121 of the switch 120 to the end terminal 114 of the voltage dividing resistor 113. A conductor 127 connects the common connection 123 of the switch 120 and the second input terminal 86 of the bridge rectifier 81.

As hereinbefore stated the potential developed across the terminals A and B of the condenser 79 is applied through an impedance matching circuit 78 to the voltage dividing circuit 77. The impedance matching circuit 78 comprises a thermionic triode tube 128 having a cathode 129, a control grid 130, and an anode 131. The potential from the condenser 79 is applied between the control grid 130 and the cathode 129 of the triode tube 128, and the voltage output which is supplied to the voltage dividing circuit 77 is developed across a cathode resistor 132, which is in series circuit relationship with the condenser 79 and the triode tube 128. The cathode resistor 132 has an upper terminal 133 and a lower terminal 134. The upper terminal 133 of the cathode resistor 132 is connected to the cathode 129 of the thermionic triode tube 128. The lower terminal 134 of the cathode resistor 132 is connected through conductor 135 to the mid-terminal 116 of the voltage dividing resistor 113. The control grid 130 of the thermionic triode tube 128 is connected through conductor 136 to the terminal B of the condenser 79. The anode 131 of the thermionic triode tube 128 is connected through conductor 137 to the end or positive terminal 115 of the voltage dividing resistor 113.

The impedance matching circuit 78 matches the high impedance of the potential source 79 to the lower impedance of the voltage dividing circuit 77. The voltage dividing circuit 77 is substantially the same as my "Voltage Dividing Circuit," Serial No. 685,945, now abandoned, filed on even date herewith. The voltage of the impedance matching circuit 78 which is applied to the voltage dividing circuit 77 is obtained across the cathode resistor 132. The voltage dividing circuit 77 comprises a biasing potential source 138, a thermionic diode tube 139 and a resistor 140 in series circuit arrangement. The biasing potential source 138 has a positive terminal 141 and a negative terminal 142. The thermionic diode tube 139 has a cathode 143 and an anode 144. The resistor 140 has an upper terminal 145 and a lower terminal 146. The positive terminal 141 of the biasing potential source 138 is connected through a conductor 147 to the upper terminal 133 of the cathode resistor 132. The negative terminal 142 of the biasing potential source 138 is connected through conductor 149 to the anode 144 of the thermionic diode tube 139. The cathode 143 of the thermionic diode tube 139 is connected to the upper terminal 145 of the resistor 140. A conductor 148 connects the lower terminal 146 of the resistor 140 to the lower terminal 134 of the cathode resistor 132.

As hereinbefore stated, the voltage dividing circuit 77 has a first output voltage means and a second output voltage means, for modifying the first and second grid circuit means 20 and 21 of the control means 19 and thereby modifying the output of the first and second excitation means respectively. The first output voltage of the voltage dividing circuit 77 appears across the terminals 133 and 145, which terminals shall be termed the first and second output terminals respectively of the voltage dividing circuit 77, which voltage is across the combination of the biasing potential source 138 and the thermionic diode tube 139. The second output voltage of the voltage dividing circuit 77 appears across the terminals 145 and 146, which are the upper and lower terminals respectively of the resistor 140, which terminals shall be termed the second and third output terminals, respectively, of the voltage dividing circuit 77.

A first regulatory means 150 is used to further modify the first grid circuit means 20 of the control means 19 and a second regulatory means 151 is used to further modify the second grid circuit means 21 of the control means 19. The first regulatory means 150 includes two resistors 152 and 153 in series across the output of the generator 13, so that a regulatory potential obtained across one of these resistors proportional to the voltage output of the generator 13 can be used to modify the voltage output of the generator 13 by modifying the first grid circuit means 20. The second regulatory means 151 includes two resistors 154 and 155 in series across the motor field 17, so that a regulatory potential obtained across one of these resistors, which will be proportional to the voltage applied to the motor field 17, can be used to modify the potential applied to the field 17, by modifying the second grid circuit means 21.

The generator 13 has a negative terminal 156 and a positive terminal 157. The motor 11 has a negative terminal 158 and a positive terminal 159. The negative terminals 156 and 158 of the generator and the motor 11 respectively, are connected by a conductor 160. The positive terminals 157 and 159 of the generator 13 and the motor 11, respectively, are connected by a conductor 161. In the first regulatory means 150, a connection 162 joins one end each of the resistors 152 and 153. The other end of the resistor 152 is connected to the conductor 160 at the connection 163, and the other end of the resistor 153 is connected to the conductor 161 at the connection 164. The second regulatory means 151 includes the resistors 154 and 155. The resistors 154 and 155 have one end each connected together at the connection 166. The other end of the resistor 154 is connected to the connection 70 of the motor field 17, and the other end of the resistor 155 is connected to the connection 71 of the motor field 17. The connection 166 which connects the two resistors 154 and 155 of the second regulatory means 151 is connected by the conductor 167 to the connection 162 which similarly connects the resistors 152 and 153 of the first regulatory means 150. A conductor 165 connects the connection 162 to the upper terminal 145 of the resistor 140, which is the second output terminal of the voltage dividing circuit 77. To complete the circuit for impressing the modifying potentials of the first and second outputs of the voltage dividing circuit 77, and the regulatory potentials of the first and second regulatory means upon the control means 19, the following connections and conductors are added: A conductor 168 is connected between the terminal 117 of the voltage dividing resistor 113 and the connection 66 between the third and fourth control grid resistors 60 and 61; a conductor 169 is connected between the first output terminal of the voltage dividing circuit 77, which is the upper terminal 133 of the cathode resistor 132, and the connection 63 which connects the first and second control grid resistors 58 and 59.

In actual operation, variations in the speed of the motor 11 are accomplished by varying the setting of the movable finger 125 of the potentiometer 119 in the potential source 76, and variations in the rate of acceleration or deceleration of the motor 11 are accomplished by varying the setting of the movable finger 108 of the potentiometer 101 of the potential source 76. The circuit operation will start with the closing of the main switch 43, which causes electrical energy to flow from the main AC source of voltage to the main transformer 39. This energization of the main transformer causes a potential to be impressed between the cathodes and anodes of the four gaseous discharge devices, which gaseous discharge devices will cause excitation current to flow in the respective fields of the generator and motor if the proper potential is impressed between the cathodes and control grids of the four gaseous discharge devices from the respective grid circuit means. In the first excitation means, as hereinbefore stated, the control voltage impressed between the cathodes and control grids of the first and second gaseous discharge devices is the first alternating current voltage, modified by the potential of the first output voltage means of the voltage dividing circuit 77, and the regulatory potential of the first regulatory means. In the second excitation means, the potential applied between the cathodes and control grids of the third and fourth gaseous discharge devices is a voltage from the voltage dividing resistor 113 and the second alternating current potential, modified by the potential of the second output voltage means of the voltage dividing circuit 77 and the regulatory potential of the second regulatory means. The operation begins with closing the main switch 43, thereby energizing the main transformer 39 and the associated rectifier circuits of the first and second excitation means, with the assumption that the prime mover 14 is turning the generator at rated speed. The switch 120 is then moved into the position so that the contact member 124 contacts the second connection 122 to the common connection 123. This connection of the switch 120 permits the unidirectional high voltage source 80 to charge the condenser 79 to a predetermined voltage at a predetermined rate. The predetermined voltage is regulated by the setting of the movable finger 125 of the potentiometer 119, and the predetermined rate of charge is regulated by the setting of the movable finger 108 of the potentiometer 101. The actual operation of this potential source circuit 76 is as follows: Electron current flows from the negative terminal 110 of the unidirectional high voltage source 80 through the conductor 112 to the terminal A of the condenser 79, through the condenser 79, thereby charging this condenser 79, to the terminal B of the condenser 79 and then to the first input terminal 85 of the bridge rectifier 81, then through the third unidirectional current passing device 89 to the second output terminal 84 of the bridge rectifier 81, then from the cathode 91 to the anode 92 of the thermionic pentode tube 82 on to the first output terminal 83 of the bridge rectifier 81, then through the second unidirectional current passing device 88 to the second input terminal 86 of the bridge rectifier 81, through the conductor 127, through the switch 120, the movable finger 125, through the right hand portion of the potentiometer 119 to the terminal 118 of the voltage dividing resistor 113, through the right hand portion of the voltage dividing resistor 113 to the end terminal 115 of the voltage dividing resistor 113, then return to the positive terminal 111 of the unidirectional high voltage source 80. The constant current passing characteristic of a thermionic pentode tube is utilized in this circuit in order to charge the condenser at an essentially uniform rate. It will be seen that as the condenser 79 charges through the passage of the aforementioned electron current, the resultant voltage applied across the cathode 91 and anode 92 of the thermionic pentode tube 82 will decrease. This decrease in applied potential across the thermionic pentode tube 82 does not materially affect the rate of passage of current, due to the essentially constant current passing characteristic of the thermionic pentode tube. The condenser 79 will charge to a potential equal to the potential setting of the movable finger 125 of the potentiometer 119 at an essentially linear rate. This charging rate will remain essentially constant for any given setting conditions. This charging rate may be varied however by the setting of the movable finger 108 of the potentiometer 101, which varies the effective negative potential applied to the control grid 93 with respect to the cathode 91 of the thermionic pentode tube 82. Variations in the setting of this movable finger 108 of the potentiometer 101 cause a more or less negative potential to be applied to the control grid 93 with respect to the cathode 91 and thereby a smaller or larger current respectively is allowed to pass through the tube 82. This variable potential across the terminals A and B of the condenser 79 is applied through the impedance matching circuit 78 to the voltage dividing circuit 77. This potential across the terminals A and B of the condenser 79 will be of the polarity such that the terminal A will be negative and the terminal B will be positive. This potential across the condenser 79 is applied between the control grid and the cathode of the thermionic triode tube 128 of the impedance matching circuit 78. The potential applied between the control grid 130 and the cathode 129 of the thermionic triode tube 128 controls the amount of current passed by this thermionic triode tube 128. The potential impressed between the anode 131 and the cathode 129 is a constant value, being supplied from the unidirectional high voltage source 80. The potential of the condenser 79 is applied between the control grid and cathode of the thermionic triode tube 128 through a portion of the voltage dividing resistor 113 which is of opposite polarity to the potential of the condenser 79. This portion of the voltage dividing resistor 113 is that portion between the terminal 116 and the end terminal 114, which applies a negative potential to the grid 130 with respect to the cathode 129. This biases the control grid negatively, and prevents current flow through the tube 128 until the potential across the condenser 79 becomes of sufficient value to adequately oppose the potential developed across that section of the voltage dividing resistor 113 between the terminals 114 and 116. The potential impressed between the control grid 130 and the cathode 129 by the portion of the voltage dividing resistor 113 between the terminals 114 and 116 alone, is sufficiently negative to prevent any current flow between the cathode and anode 131 of the thermionic triode tube 128. As the potential across the condenser 79 increases, a point is reached where the negative potential applied to the control grid 130 with respect to the cathode 129 is sufficiently small to permit passage of current between the cathode 129 and the anode 131. As the potential across the condenser 79 continues to increase, the control gird 130 becomes increasingly less negative with respect to the cathode 129, thereby permitting continually increasing amounts of current to pass between the cathode 129 and the anode 131. This passage of current from the cathode 129 to the anode 131 of the thermionic triode tube 128 will start at the negative terminal 110 of the unidirectional high voltage source 80, through the conductor 112 to the end terminal 114 of the voltage dividing resistor 113, through a part of the voltage dividing resistor 113 to the terminal 116 thereof, then through the conductor 135, through the cathode resistor 132, through the tube 128 from the cathode 129 to the anode 131, through the conductor 137 and return to the positive terminal 111 of the unidirectional high voltage source 80. This flow of current causes a voltage drop across the cathode resistor 132. This voltage drop is therefore the voltage that is applied to the voltage dividing circuit 77. This voltage drop will increase or decrease in direct proportion to the potential change across the condenser 79. The action of the voltage dividing circuit 77 is such that the potential developed across the cathode resistor 132 is impressed upon the series circuit of the voltage dividing circuit 77 consisting of the biasing potential source 138, the thermionic diode tube 139, and the resistor 140. The passage of the electron current through the impedance matching circuit 78 has caused the lower terminal 134 of the cathode resistor to be negative with respect to the upper terminal 133. This voltage therefore is connected in the series circuit arrangement of the voltage dividing circuit 77 in such a manner that the positive potential is impressed upon the anode 144 of the thermionic diode tube 139, and the negative potential is impressed upon the cathode 143 of this thermionic diode tube 139. However, the biasing potential source 138 is so connected in the series circuit arrangement that a negative potential is applied to the anode 144 of the thermionic diode tube 139. Therefore this negative potential from the biasing potential source 138 being applied to the anode 144 of the thermionic diode tube 139 prevents the anode 144 from being positive with respect to the cathode 143 until the potential across the cathode resistor 132 exceeds the potential of the biasing potential source. Until the potential across the cathode resistor 132 exceeds the biasing potential source 138, no current is passed by the thermionic diode tube 139. Under these conditions, the impedance of the thermionic diode tube 139 is very high. When the potential across the cathode resistor 132 exceeds the potential of the biasing potential source, and the thermionic diode tube passes current, a voltage drop will occur across the resistor 140. This voltage drop across the resistor 140, caused by the passage of current, is the second output voltage means. The first output voltage appears across the first and second output terminals which are terminals 133 and 145, and for all values of the voltage across the cathode resistor 132 below the potential of the biasing potential source 138 the first output voltage will be substantially equal to this voltage, because the thermionic diode tube 139 will not pass current and therefore there will be no voltage drop across the resistor 140. For values of the voltage applied across the cathode resistor 132 greater than the potential of the biasing potential source, the thermionic diode tube 139 conducts current, thereby having a low impedance, and the first output voltage will substantially equal the potential of the biasing potential source 138. The first output voltage will therefore remain constant at the potential of the biasing potential source for all values of the voltage drop across the cathode resistor 132 in excess of the potential of the biasing potential source 138. The second output voltage which is across the resistor 140, will be zero in value for all values of the potential across the cathode resistor 132 below the potential of the biasing potential source 138, because the thermionic diode tube 139 will not pass any current to permit a voltage drop across the resistor 140. When the potential across the cathode resistor 132 exceeds the potential of the biasing potential source 138 the thermionic diode tube thereby passing current, there will be a voltage drop caused by this passage of current across the resistor 140, and therefore there will be a second output voltage. This second output voltage will therefore be substantially equal to the incoming voltage across the cathode resistor 132 minus the potential of the biasing potential source 138. From the foregoing description is can be seen that the operation of the voltage dividing circuit 77 is such that an incoming signal voltage is divided into a first and second output voltage at a definite transition value governed by the potential of the biasing potential source 138. The first output voltage will vary directly with the incoming signal voltage for all values of the incoming signal voltage less than the transition value, and remain at that transition value for all values of the incoming signal voltage greater than the transition value. The second output voltage will remain at zero for all values of the incoming signal voltage below the transition value, which is governed by the potential of the biasing potential source 138, and will then vary directly with the incoming signal voltage for all values of the incoming signal voltage in excess of the biasing potential source 138.

As hereinbefore mentioned, the first and second output voltage means are used to further modify the first and second grid circuit means 20 and 21 of the control means 19 to vary the first and second excitation means 16 and 18, and therefore vary the speed of the motor 11.

A first alternating current potential is developed across the terminals 63 and 62, and the terminals 63 and 64 of the first and second control grid resistors 58 and 59, from the potential of the secondary winding 73 of the first transformer 54 and the first phase shifting condenser 56, which elements comprise the first grid circuit means 20. This first alternating current potential will be out of phase with the main alternating current source of voltage, because of the action of the first phase shifting condenser 56. This will have the effect of shifting the phase of the potential applied between the control grids and cathodes of the first and second gaseous discharge devices with respect to the alternating current voltage impressed between the cathodes and anodes of these same gaseous discharge devices. The potential of the first regulatory means will be the potential developed across the resistor 153 by the output voltage of the generator 13, and assuming the potential of the voltage output of the generator 13 to be as shown in Figure 1, the connection 162 will be negative with respect to the connection 164, which connections are across the resistor 153. The regulatory potential developed across this resistor 153 is so connected in the circuit to impress a negative voltage upon the control grid with respect to the cathode of the first and second gaseous discharge devices 23 and 24. This will have the effect of lowering the reference voltage of the first alternating current potential with respect to the main alternating current source of voltage. The potential of the first output voltage means from the voltage dividing circuit 77 is so connected in the circuit arrangement so that a positive potential is impressed upon the control grid with respect to the cathode. The first output voltage will therefore have the effect of tending to raise the reference voltage of the first alternating current potential with respect to the reference potential of the main alternating current source of voltage. To trace the circuit connections of the first grid circuit means, starting with the cathode 27 and 30 of the first and second gaseous discharge devices 23 and 24, the circuit extends through the connection 68 at one end of the generator field line 18, then to the positive terminal 157 of the generator 13, the connection 164, through the resistor 153 wherein a negative potential of the first regulatory means is impressed, to the connection 162, through the conductor 165 to the upper terminal 145 of the resistor 140, through the resistor 140, wherein a negative voltage, if any, is applied, to the lower terminal 146 of this resistor 140, through the conductor 148 to the lower terminal 134 of the cathode resistor 132, through the cathode resistor 132 where a positive potential is impressed from the first output voltage, to the upper terminal 133 of the cathode resistor 132, through the conductor 169 to the connection 163 and thence return to the respective control grids 28 and 31 through the first and second control grid resistors 58 and 59, wherein an alternating current potential of the first alternating current source is impressed. The result of the combination of these three voltages applied between the cathodes and control grids of the first and second gaseous discharge devices 23 and 24 of the first excitation means is as follows:

The linearly variable voltage generated by the potential source 76 across the condenser 79 is applied through the first output voltage means of the voltage dividing circuit 77 also as a substantially linearly variable voltage, and has a tendency to raise the reference potential of the control grid-cathode voltage with respect to the anode-cathode voltage, which will have a tendency to make the gaseous discharge devices fire earlier in the cycle, because the critical grid potential of the gaseous discharge devices is exceeded increasingly earlier in the cycle of the alternating current voltage between the anodes and cathodes; this tendency to fire or trigger the gaseous discharge devices earlier in the cycle will tend to increase the excitation of the first excitation means, which means an increase in the excitation of the generator field 15, and a consequent tendency to increase the voltage output of the generator 13. As the generator voltage tends to rise, the potential of the first regulatory means will also tend to rise, which potential tends to lower the reference potential of the grid-cathode voltage with respect to the anode-cathode voltage, therefore tending to make the gaseous discharge devices fire or trigger later in the cycle, thereby reducing the excitation supplied to the generator field 15, and consequently the generator output voltage. Of these two opposing tendencies, the first output voltage of the voltage dividing circuit is the stronger, because of the increasing voltage output of the first output voltage. The result is an essentially linear increase in the generator output voltage at a rate established by the setting of the movable finger 108 of the potentiometer 101 of the potential source 76, and to a voltage output regulated by the setting of the movable finger 125 of the potentiometer 119 of the potential source 76. The potential of the biasing potential source 138 of the voltage dividing circuit 77 will be made such that the transition value regulated by this potential, and at which value the second output voltage begins to appear, will be just sufficient to permit rated output voltage of the generator 13 and consequent rated speed of the motor 11. This transition value between the first and second output voltages of the voltage dividing circuit 77 has the effect of an automatic change over from control of the first excitation means to the control of the second excitation means, in order to obtain higher than rated speeds of the motor 11 by modifying the second grid circuit means 21 of the control means 19 of the second excitation means 18 for the motor field 17. As hereinbefore stated, the second grid circuit means 21 includes the secondary winding 75 of the second transformer 55, the second phase shifting condenser 57, the third and fourth control grid resistors 60 and 61, and a portion of the voltage dividing resistor 113, modified by the second regulatory means 151 and the second output voltage means of the voltage dividing circuit 77. This second grid circuit means 21 operates in substantially the same manner as the first grid circuit means 20. A second alternating current potential is developed across the resistors 60 and 61, from the secondary winding 75 of the second transformer 55 and the second phase shifting condenser 57. This second alternating current potential is out of phase with the main alternating current source of voltage because of the second phase shifting condenser 57, which causes the control grid-cathode voltage to be out of phase of the anode-cathode voltage of the third and fourth gaseous discharge devices 25 and 26. The excitation supplied to the motor field 17 by the second excitation means 18 will also produce a voltage across the resistors 154 and 155. The voltage developed across the resistor 154 is the potential of the second regulatory means 151, and, as shown in Figure 1, the connection 166 will be negative with respect to the connection 70 of the motor field 17. The potential of the second regulatory means 151 is so connected in the circuit arrangement so as to impress a negative potential upon the control grids of the third and fourth gaseous discharge devices 25 and 26 with respect to the cathodes of these gaseous discharge devices. This negative potential upon the control grids has the tendency to lower the reference voltage of the control grid-cathode voltage with respect to the reference voltage of the anode-cathode voltage. For the condition where there is no voltage from the second output voltage means of the voltage dividing circuit 77, where the setting of the movable finger 125 of the potentiometer 119 of the potential source 76 is causing the motor 11 to be operated at or below rated speeds, the circuit arrangement is such that a positive potential from the voltage dividing resistor 113 is applied to the control grids of the third and fourth gaseous discharge devices with respect to the cathodes, of such magnitude to permit full excitation of the motor field 17. With the setting of the movable finger 125 of the potentiometer 119 of the potential source 76 sufficient to permit a second output voltage from the voltage dividing circuit 77, the result of this second output voltage is to oppose the potential across the end portion of the voltage dividing resistor 113 so that the reference voltage of the control grid-cathode potential becomes increasingly less positive with respect to the anode-cathode potential, thereby reducing the excitation to the motor field 17, and consequently increasing the speed of the motor 11. To trace the circuit connections for the control grid-cathode potential, starting with the cathodes 33 and 36, the circuit extends through the connection 69, the connection 70, through the resistor 154, to the connection 166, wherein a negative potential of the second regulatory means is applied, through the conductors 167 and 165 to the upper terminal 145 of the resistor 140, through the resistor 140 wherein a negative potential of the second output voltage is applied, to the lower terminal 146 of the resistor 140, through the conductor 148 to the terminal 134, through the conductor 135 to the terminal 116 of the voltage dividing resistor 113, through a portion of the voltage dividing resistor 113 to the terminal 117 wherein a positive potential is applied, then through the conductor 168 to the connection 66, and return to the respective control grids 34 and 37 through the third and fourth control grid resistors 60 and 61 wherein the second alternating current potential is applied. As the potential of the second output voltage means increases, by an increasing voltage across the condenser 79 of the potential source 76, an increasingly larger negative potential is applied to the control grid with respect to the cathode of the gaseous discharge devices of the second excitation means. This increasingly negative potential has the tendency to lower the reference voltage of the second alternating current potential which is applied across the control grids and cathodes with respect to the main alternating current voltage which is applied across the anodes and cathodes. This tendency will cause the control grids to trigger or fire the gaseous discharge devices later in the cycle thereby tending to reduce the excitation supplied to the second excitation means, and consequently increase the speed of the motor 11. The tendency to reduce the excitation supplied to the motor field 17 will tend to reduce the potential developed across the resistor 154, which potential is the second regulatory potential, which tendency to reduce the second regulatory potential will tend to raise the reference voltage between the control grid and cathode with respect to the reference voltage between the anode and cathode, which will tend to increase the excitation means. These two opposing tendencies balance each other in a static condition, however, in a varying condition, the changing potential of the second output voltage will prevail, and effect the second excitation means sufficiently to re-establish the static condition. This second grid circuit means 21 of the control means 19 has the result of obtaining greater than rated speed of the motor 11. The combined operation of the first and second grid circuit means 20 and 21 of the control means 19 has the resultant effect of permitting constant acceleration of the motor 11 to any predetermined speed up to many times rated speed at a predeterminable variable acceleration rate.

To permit constant deceleration to zero speed of the motor 11, the single pole double throw switch 120 of the potential source 76 can be thrown to exclude the voltage from the unidirectional high voltage source 80 in the circuit arrangement of the potential source 76. When the switch 120 is so thrown, that is when the contact member 124 connects the first connection 121 to the common connection 123, the condenser 79 will be placed across the input terminals of the bridge rectifier 81, and will discharge through the bridge rectifier and pentode tube 82. The rate of discharge will be constant, as was the rate of charge, because of the constant current passing characteristic of the thermionic pentode tube 82. This rate of discharge will again be regulated by the setting of the movable finger 108 on the potentiometer 101. Variations in the setting of this movable finger 108 causes variations in the negative potential of the control grid 93 with respect to the cathode 91 of the thermionic pentode tube 82 and therefore vary the amount of current passed by the thermionic pentode tube 82. This has the effect of causing the condenser 79 to discharge at a substantially constant rate, which means the voltage across the condenser 79 will decrease substantially linearly. This substantially linearly decreasing voltage across the condenser 79, is, as before, applied through the impedance matching circuit 78 and the voltage dividing circuit 77, in the form of the first and second output voltages, to modify the control means 19, to regulate the excitation means and therefore the speed of the motor 11. In a circuit analysis similar to that for an increasing speed of the motor 11 by an increasing voltage across the condenser 79, the motor 11 will be caused to linearly decrease in speed by a decrease in the potential across the condenser 79.

To permit constant deceleration to any predetermined speed of the motor 11, with the motor 11 running at any given speed, the setting of the movable finger 125 of the potentiometer 119 may be changed to a lower value. Given this condition, the voltage across the terminals A and B of the condenser 79 will then be higher than the voltage applied to the circuit of the potential source 76 by the setting of the movable finger 125 of the potentiometer 119. The condenser 79 will therefore discharge through the series circuit arrangement of the high voltage unidirectional source 80 and the bridge rectifier 81. The rate of discharge will again be governed by the setting of the movable finger 108 of the potentiometer 101. The rate of deceleration will again be substantially constant, due to the constant current passing characteristic of the thermionic pentode tube 82, and static conditions will again be maintained when the voltage across the terminals A and B of the condenser 79 equals the voltage applied to the potential source 76 by the setting of the movable finger 125 of the potentiometer 119.

Throughout this description, it has been stated that an essentially linear voltage generated by the potential source 76 and applied through the first and second output voltage means of the voltage dividing circuit 77 to the control means 19 will cause essentially linear speed control of the motor 11. This characteristic of my invention is accomplished because the potential of the regulatory means opposes the potentials of the first and second output voltage means, and since the voltages of the first and second output voltage means are essentially linearly variable, the variations in motor speed will follow an essentially straight line. The effect thereby produced is that in a predetermined set condition, with these two potentials opposing each other, variations in circuit constants due to temperature rise and other variables are cancelled out by the effect of the potential of the regulatory means. In a varying condition, where the speed of the motor 11 is being caused to be either linearly increased or decreased, the opposing tendencies of the potentials of the regulatory means and the output voltage means will compensate for hysteresis and armature reaction effect because a tendency to change the output voltage of the generator from that indicated by the setting of the movable finger 125 of the potentiometer 119 will automatically bring a change in the potential delivered from the regulatory means to re-establish the predetermined set conditions as predetermined by the setting of the movable finger 125 of the potentiometer 119.

Figure 2:
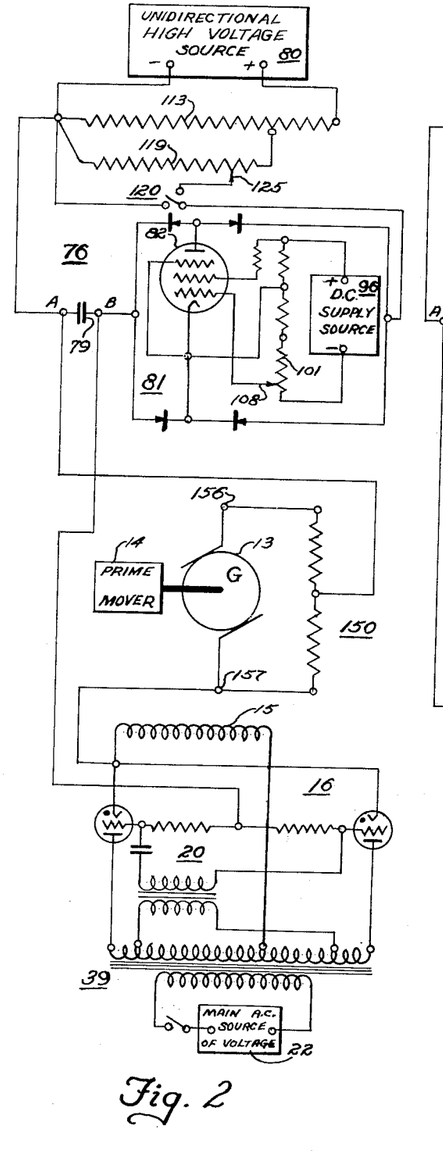
Figure 2 diagrammatically represents a simplified embodiment of my invention.
Figure 3:
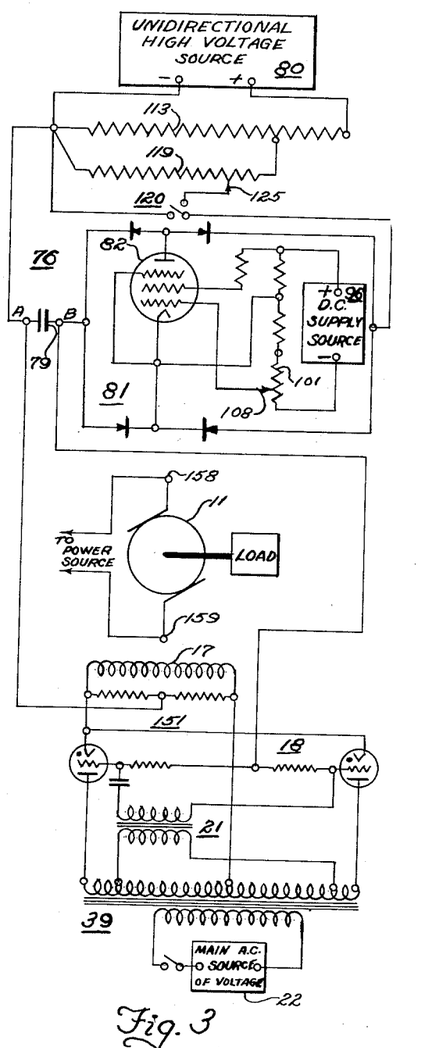
Figure 3 diagrammatically represents another simplified circuit using my invention.

From the foregoing description, it may be seen that the linearly variable voltage generated by the potential source 76 may be used to linearly vary the generator output voltage alone, as shown in Figure 2, or the speed of a motor alone, as shown in Figure 3. With reference to Figure 2, it may be seen that the linearly variable voltage of the potential source 76 is applied directly to the generator field excitation means 16 to linearly vary the generator output voltage. With reference to Figure 3, the linearly variable voltage of the potential source 76 is applied directly to the motor field excitation means 18 to linearly vary the motor speed.

Although I have described my invention with a certain degree of particularity in its preferred form it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. An electrical control circuit for varying the speed of an electric motor comprising, in combination, a generator having a field winding and an electrical output, a motor having a field winding and an electrical input, first connection means for connecting the electrical output of the said generator to the electrical input of the said motor, first excitation means including a first gaseous discharge device having a cathode and a control grid for exciting the said generator field winding, second excitation means including a second gaseous discharge device having a cathode and a control grid for exciting the said motor field winding, control means for varying the speed of the said motor, first grid circuit means impressing a potential between the cathode and the control grid of the said first gaseous discharge device, second grid circuit means impressing a potential between the cathode and control grid of the said second gaseous discharge device, a potential source for modifying the said control means, and a voltage dividing circuit connected between the said potential source and the said control means, the said voltage dividing circuit having first and second output voltage means, the said first output voltage means modifying the potential impressed between the cathode and control grid of the said first gaseous discharge device for varying the said first excitation means, the said second output voltage means modifying the potential impressed between the cathode and control grid of the said second gaseous discharge device for varying the said second excitation means.

2. An electrical control circuit for varying the speed of an electric motor comprising, in combination, a generator having a field winding and an electrical output, a motor having a field winding and an electrical input, first connection means for connecting the electrical output of the said generator to the electrical input of the said motor, first excitation means including a first gaseous discharge device having a cathode and a control grid for exciting the said generator field winding, second excitation means including a second gaseous discharge device having a cathode and a control grid for exciting the said motor field winding, control means for varying the speed of the said motor, first grid circuit means impressing a potential between the cathode and the control grid of the said first gaseous discharge device, second grid circuit means impressing a potential between the cathode and control grid of the said second gaseous discharge device, a potential source for modifying the said control means, a voltage dividing circuit connected between the said potential source and the said control means, the said voltage dividing circuit having first and second output voltage means, the said first output voltage means modifying the potential impressed between the cathode and control grid of the said first gaseous discharge device for varying the said first excitation means, the said second output voltage means modifying the potential impressed between the cathode and control grid of the said second gaseous discharge device for varying the said second excitation means, first regulatory means having a regulatory potential responsive to the electrical output of the said generator for further modifying the potential impressed between the cathode and control grid of the said first gaseous discharge device for further varying the said first excitation means, and second regulatory means having a regulatory potential responsive to the potential applied to the said motor field winding for further modifying the potential impressed between the cathode and control grid of the said second gaseous discharge device for further varying the said second excitation means.

3. An electrical control circuit for a dynamoelectric system comprising, in combination, a generator having a field winding and an electrical output, a motor having a field winding and an electrical input, first excitation means including a first gaseous discharge device having an anode, a cathode and a control grid for exciting the said generator field winding, second excitation means including a second gaseous discharge device having an anode, a cathode and a control grid for exciting the said motor field winding, a main alternating current source of voltage for supplying electrical energy between the anode and the cathode of both the first and second gaseous discharge devices for exciting the said first and second excitation means, control means for varying the said excitation means, the said control means including a first alternating current source of voltage electrically out of phase with the said main alternating current source of voltage for impressing a potential between the cathode and the control grid of the said first gaseous discharge device and a second alternating current source of voltage electrically out of phase with the said main alternating current source of voltage for impressing a potential between the cathode and control grid of the said second gaseous discharge device, a potential source for modifying the said control means, and a voltage dividing circuit connected between the said potential source and the said control means, the said voltage dividing circuit having first and second output voltage means, the said first output voltage means modifying the potential impressed between the cathode and control grid of the said first gaseous discharge device for varying the said first excitation means, and the said second output voltage means modifying the potential impressed between the cathode and control grid of the said second gaseous discharge device for varying the said second excitation means.

4. An electrical control circuit for a dynamoelectric system comprising, in combination, a generator having a field winding and an electrical output, a motor having a field winding and an electrical input, first excitation means including a first gaseous discharge device having an anode, a cathode and a control grid for exciting the said generator field winding, second excitation means including a second gaseous discharge device having an anode, a cathode and a control grid for exciting the said motor field winding, a main alternating current source of voltage for supplying electrical energy between the anode and the cathode of both the first and second gaseous discharge devices for exciting the said first and second excitation means, control means for varying the said excitation means, the said control means including a first alternating current source of voltage electrically out of phase with the said main alternating current source of voltage for impressing a potential between the cathode and the control grid of the said first gaseous discharge device and a second alternating current source of voltage electrically out of phase with the said main alternating current source of voltage for impressing a potential between the cathode and control grid of the said second gaseous discharge device, a potential source for modifying the said control means, a voltage dividing circuit connected between the said potential source and the said control means, the said voltage dividing circuit having first and second output voltage means, the said first output voltage means modifying the potential impressed between the cathode and control grid of the said first gaseous discharge device for varying the said first excitation means, the said second output voltage means modifying the potential impressed between the cathode and control grid of the said second gaseous discharge device for varying the said second excitation means, first regulatory means having a regulatory potential responsive to the electrical output of the said generator for further modifying the potential impressed between the cathode and control grid of the said first gaseous discharge device for further varying the said first excitation means, and second regulatory means having a regulatory potential responsive to the potential applied to the said motor field winding for further modifying the potential impressed between the cathode and control grid of the said second gaseous discharge device for further varying the said second excitation means.

5. An electrical control circuit for varying the speed of an electric motor comprising, in combination, a generator having a field winding and an electrical output, a motor having a field winding and an electrical input, first connection means for connecting the electrical output of the said generator to the electrical input of the said motor, first excitation means including a first gaseous discharge device having a cathode and a control grid for exciting the said generator field winding, second excitation means including a second gaseous discharge device having a cathode and a control grid for exciting the said motor field winding, control means including a first and a second grid circuit means for varying the speed of the said motor, the said first grid circuit means developing a first alternating current voltage and impressing the first alternating current voltage between the cathode and the control grid of the said first gaseous discharge device, the said second grid circuit means developing a second alternating current voltage and impressing the second alternating current voltage between the cathode and control grid of the said second gaseous discharge device, a potential source for modifying the said control means, a voltage dividing circuit connected between the said potential source and the said control means, the said voltage dividing circuit having first and second output voltage means, the said first output voltage means modifying the potential impressed between the cathode and control grid of the first gaseous discharge device for varying the said first excitation means, the said second output voltage means modifying the potential impressed between the cathode and control grid of the said second gaseous discharge device for varying the said second excitation means, first regulatory means having a regulatory potential responsive to the electrical output of the said generator for further modifying the potential impressed between the cathode and control grid of the said first gaseous discharge device for further varying the said first excitation means, and second regulatory means having a regulatory potential responsive to the potential applied to the said motor field winding for further modifying the potential impressed between the cathode and control grid of the said second gaseous discharge device for further varying the said second excitation means.

6. An electrical control circuit for varying the speed of an electric motor comprising, in combination, a generator having a field winding and an electrical output, a motor having a field winding and an electrical input, first connection means for connecting the electrical output of the said generator to the electrical input of the said motor, first excitation means including a first gaseous discharge device having an anode, a cathode and a control grid for exciting the said generator field winding, second excitation means including a second gaseous discharge device having an anode, a cathode and a control grid for exciting the said motor field winding, control means including a first and a second grid circuit means for varying the speed of the said motor, a main alternating current source of voltage for supplying a voltage between the anode and the cathode of both the first and second gaseous discharge devices for exciting the said first and second excitation means, the said first grid circuit means developing a first alternating current voltage electrically out of phase with the voltage of the said main alternating current source of voltage and impressing the first alternating current voltage between the cathode and the control grid of the said first gaseous discharge device, the said second grid circuit means developing a second alternating current voltage electrically out of phase with the voltage of the said main alternating current source of voltage and impressing the second alternating current voltage between the cathode and control grid of the said second gaseous discharge device, a potential source for modifying the said control means, a voltage dividing circuit connected between the said potential source and the said control means, the said voltage dividing circuit having first and second output voltage means, the said first output voltage means modifying the potential impressed between the cathode and control grid of the said first gaseous discharge device for varying the said first excitation means, the said second output voltage means modifying the potential impressed between the cathode and control grid of the said second gaseous discharge device for varying the said second excitation means, first regulatory means having a regulatory potential responsive to the electrical output of the said generator for further modifying the potential impressed between the cathode and control grid of the said first gaseous discharge device for further varying the said first excitation means, and second regulatory means having a regulatory potential responsive to the potential applied to the said motor field winding for further modifying the potential impressed between the cathode and control grid of the said second gaseous discharge device for further varying the said second excitation means.

7. An electrical control circuit for varying the speed of an electric motor comprising, in combination, a generator having a field winding and an electrical output, a motor having a field winding and an electric input, first connection means for connecting the electrical output of the said generator to the electrical input of the said motor, first excitation means including a first gaseous discharge device having a cathode and a control grid for exciting the said generator field winding, second excitation means including a second gaseous discharge device having a cathode and a control grid for exciting the said motor field winding, control means for varying the speed of the said motor, the said control means comprising a first and second alternating current voltage means having, respectively, a first and second alternating current voltage, the said first and second alternating current voltage means impressing the said first and second alternating current voltages between the cathodes and the control grids of the said first and second gaseous discharge devices, respectively, a potential source for modifying the said control means, a voltage dividing circuit connected between the said potential source and the said control means, the said voltage dividing circuit having first and second output voltage means, the said first output voltage means modifying the potential impressed between the cathode and control grid of the said first gaseous discharge device for varying the said first excitation means, the said second output voltage means modifying the potential impressed between the cathode and control grid of the said second gaseous discharge device for varying the said second excitation means, first regulatory means having a regulatory potential responsive to the electrical output of the said generator for further modifying the potential impressed between the cathode and control grid of the said first gaseous discharge device for further varying the said first excitation means, and second regulatory means having a regulatory potential responsive to the potential applied to the said motor field winding for further modifying the potential impressed between the cathode and control grid of the said second gaseous discharge device for further varying the said second excitation means.

8. An electrical control circuit for varying the speed of an electric motor comprising, in combination, a generator having a field winding and an electrical output, a motor having a field winding and an electrical input, first connection means for connecting the electrical output of the said generator to the electrical input of the said motor, first excitation means including a first gaseous discharge device having an anode, a cathode and a control grid for exciting the said generator field winding, second excitation means including a second gaseous discharge device having an anode, a cathode and a control grid for exciting the said motor field winding, main alternating current voltage means for supplying a voltage between the anode and the cathode of both the first and second gaseous discharge devices for exciting the said first and second excitation means, control means for varying the speed of the said motor, the said control means comprising a first and second alternating current voltage means having, respectively, a first and second voltage electrically out of phase with the voltage of the said main alternating current means, the said first and second alternating current voltage means impressing the said first and second alternating current voltage between the cathodes and the control grids of the said first and second gaseous discharge devices respectively, a potential source for modifying the said control means, a voltage dividing circuit connected between the said potential source and the said control means, the said voltage dividing circuit having first and second output voltage means, the said first output voltage means modifying the potential impressed between the cathode and control grid of the said first gaseous discharge device for varying the said first excitation means, the said second output voltage means modifying the potential impressed between the cathode and control grid of the said second gaseous discharge device for varying the said second excitation means, first regulatory means having a regulatory potential responsive to the electrical output of the said generator for further modifying the potential impressed between the cathode and control grid of the said first gaseous discharge device for further varying the said first excitation means, and second regulatory means having a regulatory potential responsive to the potential applied to the said motor field winding for further modifying the potential impressed between the cathode and control grid of the said second gaseous discharge device for further varying the said second excitation means.

9. In a dynamo-electric system having a generator and a motor, said generator and motor each having a field winding, first excitation means for exciting the said generator field winding, second excitation means for exciting the said motor field winding, the provision of control means comprising a potential source having an essentially linear automatically variable voltage over a first and a second voltage range, first output voltage means for varying the said first excitation means through the said first voltage range of the said potential source to vary the output voltage of the said generator, second output voltage means for varying the said second excitation means through the said second voltage range of the said potential source to vary the speed of the said motor, circuit means for connecting the said potential source to both the first and second output voltage means, and electronic transition means for effecting a transition in control from the said first output voltage means to the said second output voltage means at a definite transition value.

10. An electrical control circuit for essentially linear voltage and speed control of a dynamo-electric system, comprising, in combination, a generator having a field winding and an electrical output, a motor having a field winding and an electrical input, first excitation means for exciting the said generator field winding, second excitation means for exciting the said motor field winding, and control means for essentially linearly varying the said first and second excitation means to essentially linearly vary the speed of the said motor and the voltage output of the said generator, the said control means including a potential source for modifying the said first and second excitation means and a voltage dividing circuit connected between the said potential source and the said first and second excitation means, the said voltage dividing circuit having first and second output voltage means, the said first output voltage means modifying the said first excitation means, and the said second output voltage means modifying the said second excitation means, the said first output voltage means varying the voltage output of the said generator below a predetermined voltage output of the said generator, and the said second output voltage means varying the speed of the said motor above a predetermined speed of the said motor.

11. An electrical control circuit for essentially linearly predeterminably variable speed control of an electric motor, comprising, in combination, a generator having a field winding and an armature, a motor having a field winding and an armature, first connection means for connecting the armature of the generator and the armature of the motor in closed circuit relationship, and control means for varying the speed of the motor, said control means comprising first excitation means for exciting the said generator field winding, second excitation means for exciting the said motor field winding, and a voltage dividing circuit having a variable voltage source and a first and a second output voltage means, the said variable voltage source having a first and a second voltage range, means for causing the said first output voltage means to vary the speed of the said motor below a predetermined speed throughout the first voltage range of the said variable voltage source, and means for causing the said second output voltage means to vary the speed of the said motor above a predetermined speed throughout the second voltage range of the said variable voltage source, the voltage of the said variable voltage source being essentially linearly predeterminably variable.

12. In a dynamo-electric system having a generator and a motor, said generator and motor each having a field winding, a first excitation means for exciting the said generator field winding, a second excitation means for exciting the said motor field winding, the provision of control means for controlling the said first and second excitation means, said control means including a potential source having output voltage means, a voltage dividing circuit having input voltage means and first and second output voltage means, first connection means for connecting the said output voltage means of the said potential source to the said input voltage means of the said voltage dividing circuit, second connection means for connecting the said first output voltage means of the said voltage dividing circuit to the said first excitation means, and third connection means for connecting the said second output voltage means of the said voltage dividing circuit to the said second excitation means, the said potential source supplying an essentially linearly variable voltage through the output voltage means thereof to the input voltage means of the said voltage dividing circuit, the said voltage dividing circuit dividing this essentially linearly variable voltage at a definite transition value into a first and a second voltage at the said first and second output voltage means, the said first voltage of the said first output voltage means directly varying the first excitation means and varying directly with the voltage of the potential source until reaching the said definite transition value then remaining constant at this definite transition value for all values of the potential source voltage greater than this value, and the voltage of the said second output voltage inversely varying the second excitation means and remaining at zero until the voltage of the potential source reaches the said definite transition value then varying directly with the potential source above this definite value, and transition means governed by the said control means for effecting a transition from the control of the said first excitation means to the control of the said second excitation means to provide acceleration or deceleration of the said motor to any predetermined speed at an essentially constant acceleration rate, the said acceleration rate being predeterminably variable.

13. In an electrical circuit for essentially linearly varying the speed of an electric motor, the said motor deriving its power from a direct current generator, both the direct current generator and motor having separately excited field windings, first and second excitation means having respectively a first and second gaseous discharge device for exciting the respective generator and motor field windings, the said gaseous discharge devices having a control grid and a cathode, the provision of control means for varying the speed of the said motor by varying the said first and second excitation means, the said control means comprising first and second grid circuit means for applying a potential between the control grids and cathodes of the respective gaseous discharge devices, a potential source for modifying the said control means, a voltage dividing circuit connected between the said potential source and the said control means, the said voltage dividing circuit having first and second output voltage means, the said first output voltage means modifying the said first grid circuit means, the said second output means modifying the said second grid circuit means, the said potential source having output voltage means with a first and a second output terminal and comprising a bridge rectifier having a first and second input and a first and second output terminals, a unidirectional predeterminably variable substantially constant current passing device connected between the two output terminals of the bridge rectifier, an electrical device, a unidirectional predeterminably variable high voltage source, first disengageable electrical connection means for connecting the said input terminals of the said bridge rectifier in series circuit relationship with the said unidirectional high voltage source and the said electrical device, and second disengageable electrical connection means for connecting the said input terminals of the said bridge rectifier in series circuit relationship with the said electrical device, the said voltage dividing circuit comprising the output voltage means of the said potential source, a biasing potential source having a first and a second terminal, a thermionic tube having a cathode and an anode, an impedance device having a first and a second terminal, first connection means for connecting the first terminal of the said output voltage means of the said potential source to the first terminal of the said biasing potential source, second connection means for connecting the second terminal of the said biasing potential source to the anode of the said thermionic tube, third connection means for connecting the cathode of the said thermionic tube to the first terminal of the said impedance device, and fourth connection means for connecting the second terminal of the said impedance device to the second terminal of the said output voltage means of the said potential source, the potential of the said first output voltage means appearing across the combination of the biasing potential source and the thermionic tube, and the potential of the said second output voltage means appearing across the said impedance device, means for energizing the said first output voltage means from the said potential source until reaching a predetermined definite transition value then remaining constant at this definite transition value for all values of the potential source voltage greater than this value, and means for energizing the said second output voltage means from the said potential source at a zero value until the voltage of the potential source reaches the said definite transition value then varying directly with the potential source above this definite transition value, the said first output voltage means directly varying the said first excitation means, the said second output voltage means opposing the said second excitation means, the said control means effecting a transition from the control of the said first excitation means to the control of the said second excitation means to provide essentially linear acceleration or deceleration of the said motor to any predeterminable speed at an essentially constant acceleration rate, the said acceleration rate being predeterminably variable.

14. In a system including a dynamoelectric machine having a field winding and excitation means for exciting said field winding, the provision of control means for varying the excitation means, a potential source having output voltage means, and connection means for connecting said output voltage means to said control means, the said potential source supplying an essentially linearly variable voltage through the output voltage means thereof to said control means, the voltage of said potential source essentially linearly varying the said excitation means to thus control said dynamoelectric machine in an essentially linear manner, the said output voltage means of said potential source being first and second output terminals, said potential source including a rectifier having first and second input and first and second output terminals, a substantially constant current passing device connected between the two output terminals of the rectifier, an electrical device, a unidirectional voltage source, first electrical connection means for connecting the said input terminals of the said rectifier in series circuit relationship with the said unidirectional voltage source and the said electrical device, and second electrical connection means for connecting the said input terminals of the said rectifier in series circuit relationship with the said electrical device, the said first and second output terminals of said potential source being connected across said electrical device.

15. In a system including a dynamoelectric machine having a field winding and excitation means for exciting said field winding, the provision of control means for varying the excitation means, a potential source having output voltage means, and connection means for connecting said output voltage means to said control means, the potential source supplying an essentially linearly variable voltage through the output voltage means thereof to said control means, the voltage of said potential source essentially linearly varying the said excitation means to thus control said dynamoelectric machine in an essentially linear manner, the said output voltage means of said potential source being first and second output terminals, said potential source including a bridge rectifier having first and second input and first and second output terminals, a unidirectional predeterminably variable substantially constant current passing device connected between the two output terminals of the bridge rectifier, an electrical energy storage device, a unidirectional predeterminably variable voltage source, first disengageable electrical connection means for connecting the said input terminals of the said bridge rectifier in series circuit relationship with the said unidirectional voltage source and the said electrical energy storage device, and second disengageable electrical connection means for connecting the said input terminals of the said bridge rectifier in series circuit relationship with the said electrical device, the said first and second output terminals of said potential source being connected across said electrical energy storage device.

16. In a motor control system having a motor with a field winding and excitation means for exciting said field winding, the provision of control means for varying the excitation means, a potential source having output voltage means, and connection means for connecting said output voltage means to said control means, the said potential source supplying an essentially linearly variable voltage variable at a predeterminably variable rate through the output voltage means thereof to said control means, the voltage of said potential source varying the said excitation means to thus control the speed of said motor at predeterminably variable rates, the said output voltage means of said potential source being first and second output terminals, said potential source including a rectifier having first and second input and first and second output terminals, a substantially constant current passing device connected between the two output terminals of the rectifier, an electrical device, a unidirectional voltage source, first electrical connection means for connecting the said input terminals of the said rectifier in series circuit relationship with the said unidirectional voltage source and the said electrical device, and second electrical connection means for connecting the said input terminals of the said rectifier in series circuit relationship with the said electrical device, the said first and second output terminals of said potential source being connected across said electrical device.

17. In a generator control system having a generator with a field winding and excitation means for exciting said field winding, the provision of control means for varying the excitation means, a potential source having output voltage means, and connection means for connecting said output voltage means to said control means, the said potential source supplying an essentially linearly variable voltage through the output voltage means thereof to said control means, the voltage of said potential source essentially linearly varying the said excitation means to thus control the voltage of said generator in an essentially linear manner, the said output voltage means of said potential source being first and second output terminals, said potential source including a rectifier having first and second input and first and second output terminals, a substantially constant current passing device connected between the two output terminals of the rectifier, an electrical device, a unidirectional voltage source, first electrical connection means for connecting the said input terminals of the said rectifier in series circuit relationship with the said unidirectional voltage source and the said electrical device, and second electrical connection means for connecting the said input terminals of the said rectifier in series circuit relationship with the said electrical device, the said first and second output terminals of said potential source being connected across said electrical device.

18. In a dynamoelectric system having a generator and a motor, said generator and motor each having a field winding, first excitation means for exciting the said generator field winding, and second excitation means for exciting the said motor field winding, the provision of control means comprising, an automatically variable voltage for controlling said excitation means, said voltage adapted to exceed a definite voltage value, and transition means for effecting a transition in control from the first to the second excitation means as said variable voltage exceeds said definite voltage value.

19. In a system including a dynamoelectric machine having a field winding and excitation means for exciting said field winding, the provision of control means for varying the excitation means, a potential source having output voltage means, and connection means for connecting said output voltage means to said control means, the said potential source supplying a voltage variable at a predeterminably variable rate through the output voltage means to said control means, the voltage of said potential source varying the said excitation means to thus control a characteristic of said dynamoelectric machine at predeterminably variable rates of change of said characteristic, said potential source including an electrical energy storage device with the output voltage means connected thereacross, a unidirectional voltage source, and connection means for connecting said unidirectional voltage source to said electrical device to store electrical energy therewithin.

20. In a system including a dynamoelectric machine having a field winding and excitation means for exciting said field winding, the provision of control means for varying the excitation means, a potential source having output voltage means, and connection means for connecting said output voltage means to said control means, the said potential source supplying a voltage variable at a predeterminably variable rate through the output voltage means to said control means, the voltage of said potential source varying the said excitation means to thus control a characteristic of said dynamoelectric machine at predeterminably variable rates of change of said characteristic, the said output voltage means of said potential source being first and second output terminals, said potential source including a rectifier having first and second input and first and second output terminals, a substantially constant current passing device connected between the two output terminals of the rectifier, an electrical device, a unidirectional voltage source, first electrical connection means for connecting the said input terminals of the said rectifier in series circuit relationship with the said unidirectional voltage source and the said electrical device, and second electrical connection means for connecting the said input terminals of the said rectifier in series circuit relationship with the said electrical device, the said first and second output terminals of said potential source being connected across said electrical device.

JAY W. PICKING.

REFERENCES CITED

The following references are of record in the file of this patent:

UNITED STATES PATENTS

| Number | Name | Date |
|---|---|---|
| 773,836 | White | Nov. 1, 1904 |
| 865,822 | Bogen | Sept. 10, 1907 |
| 2,229,968 | Garman | Jan. 28, 1941 |
| 2,255,488 | Huston | Sept. 9, 1941 |
| 2,301,689 | Edwards et al. | Nov. 10, 1942 |
| 2,393,618 | Edwards et al. | Jan. 29, 1946 |